(12) United States Patent
Bahai et al.

(10) Patent No.: US 6,522,706 B1
(45) Date of Patent: Feb. 18, 2003

(54) DELAY SPREAD ESTIMATION FOR MULTIPATH FADING CHANNELS

(75) Inventors: Ahmad Reza Bahai, Lafayette, CA (US); Kumud Kumar Sanwal, Iselin, NJ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/456,604

(22) Filed: Dec. 8, 1999

Related U.S. Application Data

(60) Provisional application No. 60/111,703, filed on Dec. 10, 1998.

(51) Int. Cl.[7] .................................................. H03D 7/00
(52) U.S. Cl. ........................ 375/343; 375/357; 375/363; 375/371
(58) Field of Search ................................ 375/343, 340, 375/316, 354, 357, 363, 371

(56) References Cited

U.S. PATENT DOCUMENTS

| | | | | | |
|---|---|---|---|---|---|
| 5,400,368 A | * | 3/1995 | Cheng et al. | ................ | 375/354 |
| 5,491,726 A | * | 2/1996 | Cheng et al. | ................ | 375/343 |
| 6,028,901 A | * | 2/2000 | Huynh et al. | ................ | 375/229 |
| 6,097,770 A | * | 8/2000 | Bahai et al. | ................ | 375/343 |
| 6,151,484 A | * | 11/2000 | Ramesh | ...................... | 375/232 |
| 6,389,295 B1 | * | 5/2002 | Ramesh | ...................... | 375/232 |

* cited by examiner

Primary Examiner—Chi Pham
Assistant Examiner—Pankaj Kumar
(74) Attorney, Agent, or Firm—Armstrong Teasdale LLP

(57) ABSTRACT

An efficient method of accurately estimating delay spread in multi-path transmission applications is based on quantifying the effect of the actual delay spread on the shape of the correlation energy profile between the received signal and the synchronization pattern of the receiver. Depending on the degree of the estimated delay spread, an appropriate demodulation technique is selected for optimizing the receiver performance over a range of channel multi-path conditions. The invention is applicable to digital wireless mobile communication systems, as well as to any device that performs characterization or testing of a transmission system.

14 Claims, 3 Drawing Sheets

DELAY SPREAD ESTIMATION FOR MULTIPATH FADING CHANNELS

CROSS REFERENCE TO RELATED APPLICATIONS

This application claims the benefit of Provisional Patent Application No. 60/111,703, filed Dec. 10, 1998, entitled "Delay spread estimation technique in multi-path fading channels for mobile communication system."

BACKGROUND OF THE INVENTION

The present invention relates to digital wireless mobile communication systems employing a synchronization sequence, and more specifically, to methods and apparatus for estimating the delay spread in a time-varying multi-path fading channel.

Modem wireless mobile receivers are commonly implemented using digital signal processors. The signal of interest is first processed at the analog front-end circuitry, and is then sampled by an analog to digital converter (ADC). Subsequent processing is implemented on the stored digital samples, which are outputted from the ADC.

The propagation of a signal through a typical wireless channel generally results in a number of impairments on the received signal, such as multiplicative, dispersive, and additive imperfections. The dispersive imperfections introduced by multipath propagation may result in inter-symbol interference, which can require the use of equalization in the demodulation process. Demodulation refers to the extraction of transmitted message data from the samples of the received signal passing through the propagation channel.

Even in the presence of severe impairments, however, algorithms can be used by the digital signal processor to enable the reliable decoding of the transmitted data.

One important type of transmission impairment is known as delay spread, which is caused by the delay time of a signal being propagated over multiple paths (multi-path fading). This delay spread impairment is time-varying in a wireless mobile environment and causes interference between differently delayed versions of the same symbol, which arrive from different paths with varying delay intervals.

For many practical systems, the decoding to be performed in the case of minimal delay spread conditions is relatively simple. On the other hand, the decoding process in the presence of larger delay spread conditions requires the use of an equalizer scheme. However, the implementation of an equalizer scheme results in performance variations, and also further complicates the processing required, which translates to increases in instruction cycles and power consumption. Therefore, it is important to select the most efficient decoding scheme available for the particular multi-path channel environment.

In order to select the most appropriate decoding (demodulation) scheme, a delay spread estimation method is required. The delay spread estimation establishes the essential criterion upon which the selection of a demodulation technique is based.

Known delay spread estimation techniques are generally related to the estimation of either the variation of timing and conclusions based on the amount of this variation, or they involve performing the demodulation under different schemes, and concluding that the scheme with the best performance is most appropriate for the receive processing function.

One such scheme is disclosed in U.S. Pat. No. 5,400,368. However, the disclosed scheme does not take any advantage of the shape and roll-off of the correlation of the received signal with the synchronization pattern. In addition, the disclosed scheme does not take into consideration the effects of different degrees of delay spread conditions.

Accordingly, it is an object of the present invention to overcome the disadvantages of the prior art through an improved method of delay spread estimation, which enables the optimal selection of a demodulation technique.

BRIEF SUMMARY OF THE INVENTION

In accordance with an illustrative embodiment of the present invention, a method for estimating the delay spread of a received signal waveform comprises the following steps:

1) receiving a sampled segment of the signal waveform which corresponds to a predetermined synchronization sequence;
2) resampling the received sampled segment at a high sampling rate;
3) correlating the synchronization sequence with the resampled segment corresponding to different sampling times;
4) computing a correlation energy profile from these correlations, and determining the peak energy value and its position within the correlation energy profile;
5) computing correlation energy values at preselected equal offsets, before and after the position of the peak energy value;
6) determining the maximum of these offset correlation energy values, and computing a delay criterion, based on the ratio of this maximum offset correlation energy value to the peak energy value;
7) smoothing the data by averaging;
8) referencing the smoothed delay criterion to a predetermined lookup table; and
9) obtaining the estimated delay spread from the lookup table.

In most cases, it is desirable to know if the delay spread falls within a particular range. For this purpose, thresholds can be set up in the lookup table to identify delay spread ranges.

An illustrative embodiment of the present invention is more fully described below in conjunction with the following drawings.

DETAILED DESCRIPTION OF THE INVENTION

This invention is applicable to digital communication systems that employ a synchronization sequence to aid in timing, or initial training. In wireless applications, such situations are commonly found in TDMA (Time Division Multiple Access) and some CDMA (Code Divisional Multiple Access) systems, since the timing is critical for the detection of the transmitted data in a mobile environment.

In one embodiment of the present invention, a synchronization sequence has a length L, which is denoted by S[i], where i=0,1,2, ... L−1. The receiver is designed so that the analog waveform received is sampled at a frequency that satisfies or exceeds the Nyquist sampling rate, so as to preclude any aliasing effects. This implies that the received waveform may be resampled in the digital domain at any arbitrary frequency, and with any desired initial sampling phase.

In one embodiment, resampling of the segment of the received signal waveform corresponding to the synchronization sequence is performed at a high sampling rate; for example, M times the symbol rate, where M is chosen in accordance with system implementation requirements. Oversampled received signal samples are denoted by r[k], where k=0,1,2, ... The known synchronization pattern is then correlated with the resampled versions corresponding to different sampling times, to obtain the desired correlations. The computation of a jth correlation result C(j) is performed in accordance with a relationship written as:

$$C(j) = \sum_{i=0}^{L-1} S^*[i]r[iM+j] \quad (1)$$

Figure 1:
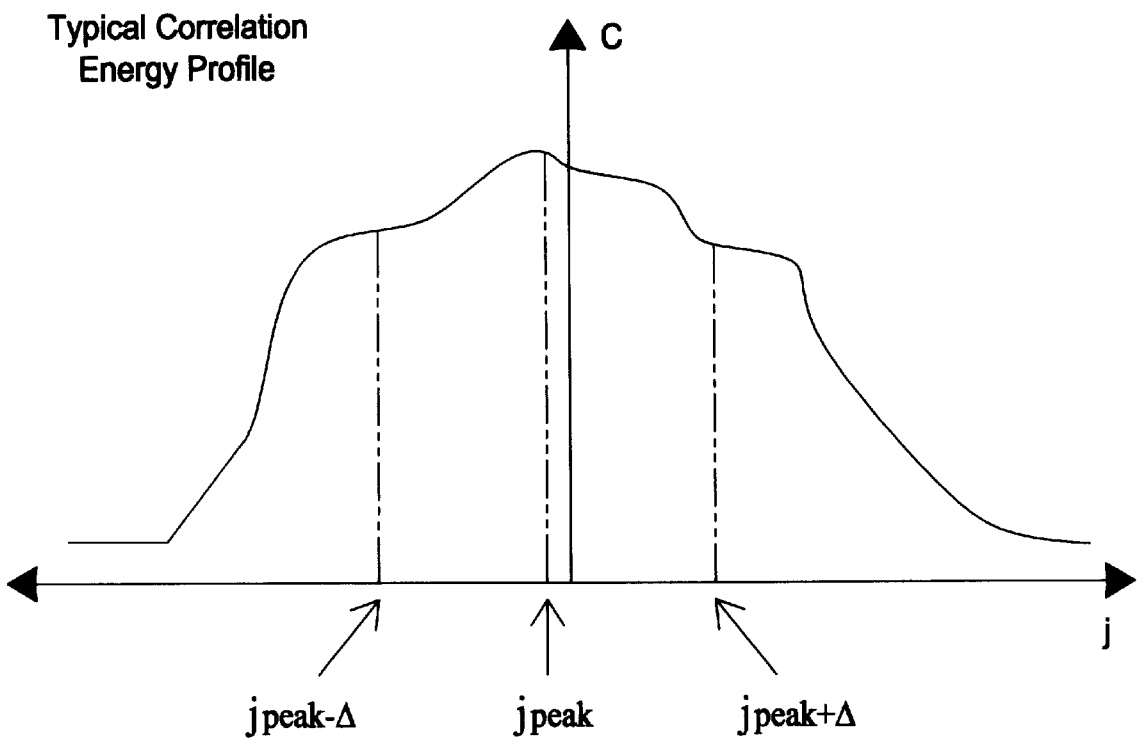
FIG. 1 is a graph of a typical correlation energy profile.

A peak value of the correlation energy $|C(j)|^2$ is determined, and both a location and value of this peak are stored. These parameters are denoted by $j_{peak}$ and $|C(j_{peak})|^2$, respectively. In addition, correlation energy values are computed at offsets of $\pm\Delta$ from $j_{peak}$ where $\Delta$ is chosen in accordance with a modulation pulse shape, and is less than one symbol duration. A representative correlation energy profile is shown in FIG. 1, with the above described j-values indicated.

A maximum of the two offset correlation energy values is compared to the peak correlation energy value, and the resulting ratio determines the value of the delay criterion $D_{crit}$, in accordance with a relationship written as:

$$D_{crit} = \max(|C(j_{peak}-\Delta)|^2, |C(j_{peak}+\Delta)|^2)/|C(j_{peak})|^2 \quad (2)$$

Delay criterion value ($D_{crit}$) can be averaged over multiple received synchronization sequences, and increases monotonically with the channel-induced delay spread. As such, in one embodiment, this relationship is used in the determination of delay spread. Since it is usually important to know if the delay spread is within a certain range, in some embodiments, suitable thresholds in lookup tables are used for decision making.

Figure 2:
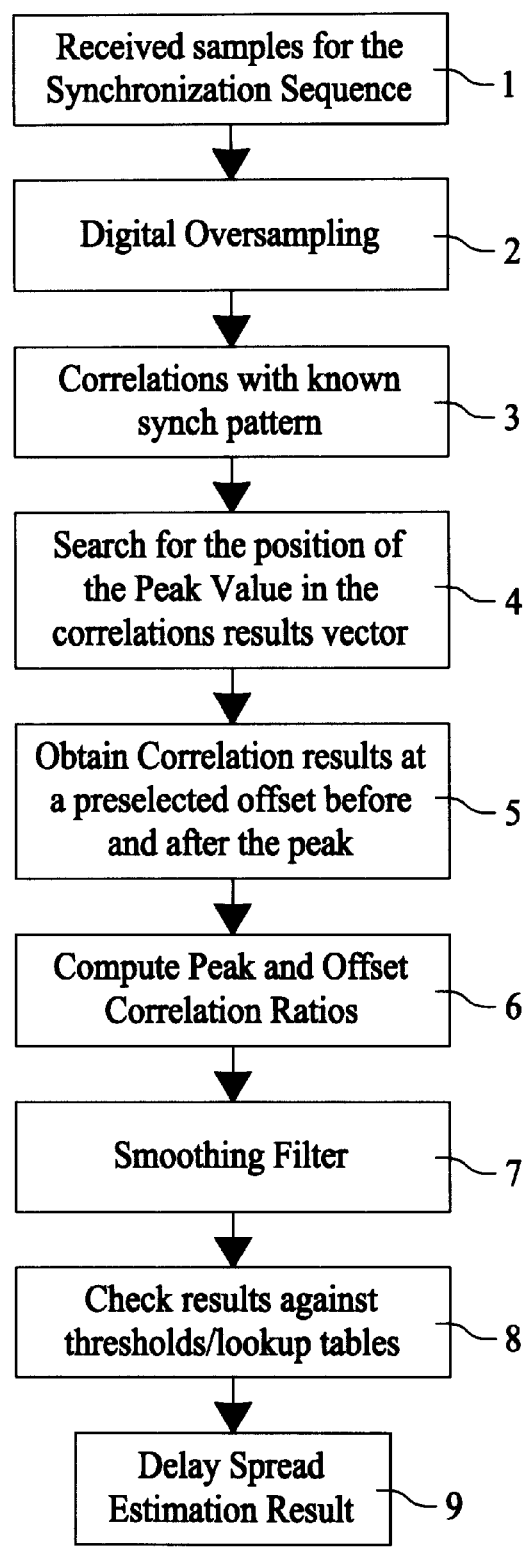
FIG. 2 is a flow diagram of the inventive delay spread estimation method.

A flow diagram of the above described inventive process is shown in FIG. 2. First, a segment of a signal waveform corresponding to the synchronization sequence is received 1. The received segment is resampled 2 at a high sampling rate and correlated 3 with a known synchronization pattern. Next, the location and peak value of the correlation energy is found 4 and correlation energy values are obtained 5 at preselected equal offsets, before and after the peak value. The delay criterion is next determined 6, based on a ratio of the maximum offset value and the peak value. The delay criterion is averaged 7 over multiple received synchronization sequences and resultant data is referenced 8 to predetermined thresholds in a lookup table. The delay spread estimate is identified 9.

Computation of the delay criterion $D_{crit}$, as described above, is based on values at offsets of $\pm\Delta$. However, in one embodiment, the process is extended to encompass a number of intervals that are multiples of $\Delta$. This extension allows this embodiment to perform delay spread estimations for a larger range of delay spread characteristics.

The accurate delay spread estimation technique disclosed herein offers a specific approach for determining the appropriate method of demodulation. A proper selection of demodulation technique becomes critical in wireless systems when optimizing a balance between power consumption and receiver performance. Under typical mobile communications applications, it is not uncommon for a mobile terminal to experience both high and low delay spread conditions. Therefore, satisfying both high and low delay spread conditions, while at the same tome efficiently managing power consumption, represents a distinct performance advantage over the prior art.

Figure 3:
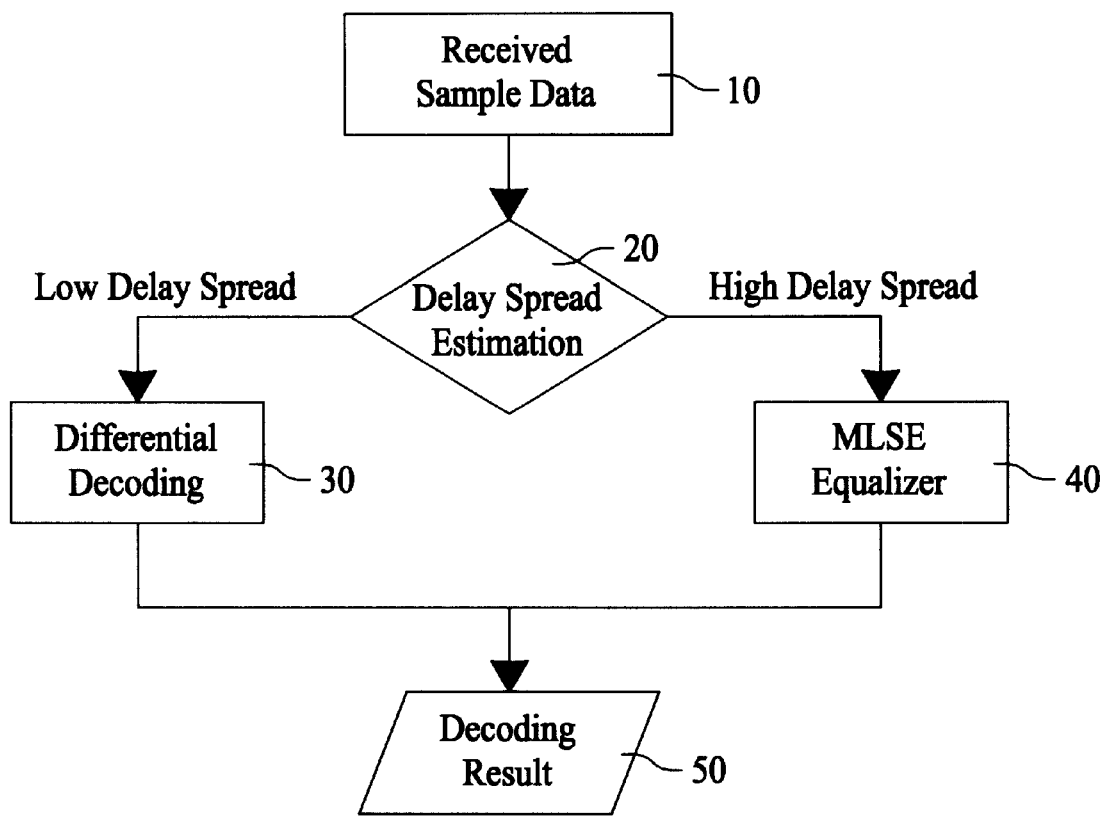
FIG. 3 is a flow diagram of a system application of the inventive method.

Operation of one embodiment of a system is illustrated by the flow diagram of FIG. 3. Received sample data is processed 10 as described above to determine 20 an accurate delay spread estimate. If a low delay spread is estimated, a differential decoding demodulation technique is selected 30. If a high delay spread is estimated, an MLSE (Maximum Likelihood Sequence Estimation) equalizer demodulation technique is selected 40. Finally, an optimally demodulated result is output 50 as the decoded result.

The present invention is applicable to other forms of receiver implementation and channel characterization applications, due to its estimation nature and its use of a known characteristic pattern. For example, the present invention can be adapted for application to fixed wireless products over certain types of terrain, or to any device that performs characterization or testing of a transmission system.

In short, a method of accurately estimating the delay spread of a multi-path propagation channel is disclosed. As a result, an optimal demodulation technique is readily determined. Moreover, the disclosed invention can be adapted to a wide variety of radio transmission and receiver applications.

The above described embodiments of the invention are intended to be illustrative only. Numerous alternative embodiments may be devised by those skilled in the art without departing from the spirit and scope of the following claims.

What is claimed is:

1. A method for estimating a delay spread of a received signal waveform transmitted through a time-varying multi-path propagation channel, said method comprising the steps of:

sampling a segment of said signal waveform that corresponds to a predetermined synchronization sequence, resampling said sampled received segment at a high sampling rate, correlating said synchronization sequence with said resampled segment corresponding to different sampling times, computing a correlation energy profile from said correlations, determining the peak energy value and its position within said correlation energy profile, computing correlation energy values at preselected equal offsets, before and after said position of said peak energy value, determining a maximum of said offset correlation energy values, computing a delay criterion, based on the ratio of said maximum offset correlation energy value to said peak energy value, and referencing said delay criterion to a predetermined lookup table to obtain an estimate of the delay spread.

2. A method in accordance with claim 1 wherein computing a delay criterion comprises the step of computing a delay criterion averaged over multiple received synchronization sequences.

3. A method in accordance with claim 1 wherein referencing the delay criterion to a predetermined lookup table comprises referencing the delay criterion to a predetermined lookup table containing predetermined delay spread thresholds.

4. A method in accordance with claim 1 wherein computing a correlation energy profile comprises computing a correlation energy profile written as:

$$C(j) = \sum_{i=0}^{L-1} S^*[i] r[iM + j]$$

where C(j) is a jth correlation result;
S[i] is a synchronization sequence, where i=0,1,2, ... L−1;
L is a length of the synchronization sequence;
r[k] is a sequence of oversampled received signal samples, where k=0,1,2, ... ; and
a resampling rate of the received signals is M times a symbol rate of the received signal.

5. A method in accordance with claim 1 wherein computing a delay criterion comprises computing a delay criterion written as:

$$D_{crit} = \max(|C(j_{peak}-\Delta)|^2, |C(j_{peak}+\Delta)|^2)/|C(j_{peak})|^2$$

where $D_{crit}$ is the delay criterion;
$C(j_{peak})$ is a peak value of correlation energy $|C(j)|^2$, where C(j) is a jth correlation result;
$j_{peak}$ is a location of the peak value of correlation energy; and $\Delta$ is an offset less than one symbol duration from $j_{peak}$ selected in accordance with a modulation pulse shape.

6. A method in accordance with claim 1 wherein computing a delay criterion comprises the step of computing a delay criterion in accordance with multiples of said offsets.

7. A method in accordance with claim 1 further comprising the step of selecting a demodulation technique in accordance with the estimated delay spread.

8. A method in accordance with claim 7 wherein selecting a demodulation technique in accordance with the estimated delay spread comprises the step of selecting a selecting a differential decoding demodulation technique when estimated delay spread is below a predetermined threshold.

9. A method in accordance with claim 7 wherein selecting a demodulation technique in accordance with the estimated delay spread comprises the step of selecting an MLSE (Maximum Likelihood Sequence Estimation) equalizer demodulation technique when the estimated delay spread is above a predetermined threshold.

10. A communication receiver device having delay spread estimation capability, comprising:
a receiver circuit for receiving a sampled segment of a signal waveform which corresponds to a predetermined synchronization sequence,
a resampling circuit for digitally sampling said received sampled segment at a high sampling rate,
a processing circuit for correlating said synchronization sequence with said resampled segment corresponding to different sampling times,
said processing circuit for computing a correlation energy profile from said correlations,
said processing circuit for determining the peak energy value and its position within said correlation energy profile,
said processing circuit for computing correlation energy values at preselected equal offsets, before and after said position of said peak energy value,
said processing circuit for determining a maximum of said offset correlation energy values,
said processing circuit for computing a delay criterion, based on the ratio of said maximum offset correlation energy value to said peak energy value, and
a comparison circuit for determining said delay spread estimation by referencing said delay criterion to a lookup table.

11. The communication device of claim 10 wherein said delay criterion is averaged over multiple received synchronization sequences.

12. The communication device of claim 10 wherein said computation of said correlation energy profile in step d) is derived from an equation written as:

$$C(j) = \sum_{i=0}^{L-1} S^*[i] r[iM + j]$$

where C(j) is a jth correlation result;
S[i] is a synchronization sequence, where i=0,1,2, ... L−1;
L is a length of the synchronization sequence;
r[k] is a sequence of oversampled received signal samples, where k=0,1,2, ... ; and
a resampling rate of the received signals is M times a symbol rate of the received signal.

13. The communication device of claim 10 wherein said computation of said delay criterion in step h) is derived from an equation written as:

$$D_{crit} = \max(|C(j_{peak}-\Delta)|^2, |C(j_{peak}+\Delta)|^2)/|C(j_{peak})|^2$$

where $D_{crit}$ is the delay criterion;
$C(j_{peak})$ is a peak value of correlation energy $|C(j)|^2$, where C(j) is a jth correlation result;
$j_{peak}$ is a location of the peak value of correlation energy; and $\Delta$ is an offset less than one symbol duration from $j_{peak}$ selected in accordance with a modulation pulse shape.

14. The communication device of claim 10 wherein said computation of said delay criterion is based on multiples of said offsets.

* * * * *

UNITED STATES PATENT AND TRADEMARK OFFICE
CERTIFICATE OF CORRECTION

| | | |
|---|---|---|
| PATENT NO. | : 6,522,706 B1 | |
| APPLICATION NO. | : 09/456604 | |
| DATED | : February 18, 2003 | |
| INVENTOR(S) | : Bahai et al. | |

It is certified that error appears in the above-identified patent and that said Letters Patent is hereby corrected as shown below:

In column 4, line 10, delete "same tome" and insert therefor -- same time --.

In claim 8, column 5, line 46, after "the step of" delete "selecting a".

In claim 12, column 6, line 24, after "profile" delete "in step d)".

In claim 12, column 6, line 41, after delete "Mtimes" and insert therefor -- M times --.

In claim 13, column 6, line 44, after "criterion" delete "in step h)".

Signed and Sealed this

Eighth Day of August, 2006

JON W. DUDAS
*Director of the United States Patent and Trademark Office*